United States Patent Office 2,845,407
Patented July 29, 1958

2,845,407

AMINOALKYL VINYL ETHERS AND DERIVATIVES THEREOF

Warren H. Watanabe and Sidney Melamed, Philadelphia, Pa., assignors to Rohm & Haas Company, Philadelphia, Pa., a corporation of Delaware No Drawing. Application September 21, 1954
Serial No. 457,566

15 Claims. (Cl. 260—86.1)

This invention relates to novel aminoalkyl vinyl ethers in which the nitrogen atom is attached to a tertiary carbon atom, polymers thereof and to processes of forming the ethers and their polymers.

The new aminoalkyl vinyl ethers have a structure defined by the chemical Formulas I and II following:

$$CH_2{:}CHOZC(R)(R')NHR^2 \qquad I$$

in which Z is a divalent hydrocarbon group of 1 to 7 carbon atoms which may be partly or entirely in a straight chain, branched chain, or cyclic arrangement, and preferably is an alkylene group of 1 to 7 carbon atoms, R is an alkyl group of 1 to 4 carbon atoms, R' is an alkyl group of 1 to 4 carbon atoms, and $R^2$ is hydrogen, a hydrocarbon group having 1 to 19 carbon atoms, a heterocyclic group or a heterocyclic-substituted hydrocarbon group such as 2-tetrahydrofurfuryl-methyl and 2-thienyl, and is preferably hydrogen, an alkyl group of 1 to 18 carbon atoms, benzyl, or cyclohexylmethyl $$CH_2{:}CHOANHC(R)(R')R^4 \qquad II$$

in which R and R' are as defined above, A is a hydrocarbon group having 2 to 18 carbon atoms and having at least two carbon atoms between the ether oxygen and nitrogen, and is preferably an alkylene group having 2 to 6 carbon atoms or a cyclohexylene-1,2 group, and $R^4$ is an alkyl group of 1 to 21 carbon atoms and preferably of 1 to 4 carbon atoms.

The ethers of this invention may be obtained by the reaction of acetylene in the presence of a basic catalyst on aminoalcohols of Formulas III and IV respectively:

$$HOZC(R)(R')NHR^2 \qquad III$$

$$HOANHC(R)(R')(R^4) \qquad IV$$

in which the symbols have the same definitions as those given above. The reaction is readily carried out in the presence of a small amount (5% to 10%) of an alkali metal hydroxide, such as potassium hydroxide as catalyst. Acetylene is passed into the alcohol at 100° to 180° C. under pressures of 200 to 500 pounds per square inch gage. The vinyl ethers which are thus formed are separated by distilling under reduced pressure.

More specifically, a reaction charge may consist of an aminoalcohol containing 10 mole percent of its sodium salt as catalyst prepared either by the addition of sodium metal or from sodium hydroxide with subsequent removal of reaction water. This charge is placed in a clean, dry autoclave which is then swept with nitrogen and then acetylene. The charge is heated to 100° to 130° C. and acetylene added to 400 to 500 p. s. i. gage pressure. The pressure is maintained by subsequent acetylene addition during the reaction and the temperature is kept below 150°, preferably at 140° to 145°. The crude product is flash-distilled, dried with solid KOH and redistilled.

As typical aminoalcohols there may be used 4-amino-4-methylpentanol, 4-amino-4-methyl-2-pentanol, 2-amino-2-methylpropanol, 2-amino-2-ethylpropanol, 2-N-methyl-amino-2-methylpropanol, 2-N-butylamino-2-methylpropanol, 2-N-2-ethylhexylamino-2-methylpropanal, 2-N-dodecylamino-2-methylpropanol, 2-N-allylamino-2-methylpropanol, 2-benzylamino-2-methylpropanol, 2-N-cyclohexylamino-2-methylpropanol, 2-amino-2-methylbutanol, 2-N-methylamino-2-methylbutanol, 2-N-benzylamino-2-methylbutanol, 2-N-cyclohexylamino-2-methylbutanol, 7-amino-3,7-dimethyloctanol. Examples of aminoalcohols of Formula IV include 2-N-t-butylaminoethanol, 2-N-t-butylaminopropanol, 3-N-t-butylaminopropanol, 2-N-1,1,5-trimethylheptylaminoethanol, 2-N-1,1,3,3-tetramethylbutylaminoethanol, also those having the individual formulas:

$$HOC_2H_4NHC(CH_3)_2C_{15}H_{31}$$
$$HOC_2H_4NHC(CH_3)_2C_{21}H_{43}$$
$$HO(CH_2)_4NHC(CH_3)_3$$
$$HO(CH_2)_{19}NHC(CH_3)_3$$

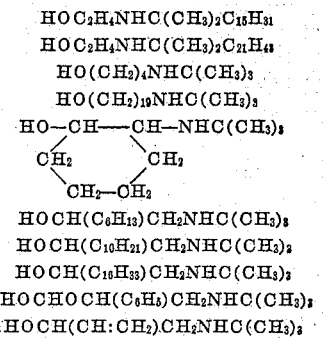

$$HOCH(C_6H_{13})CH_2NHC(CH_3)_3$$
$$HOCH(C_{10}H_{21})CH_2NHC(CH_3)_3$$
$$HOCH(C_{15}H_{33})CH_2NHC(CH_3)_3$$
$$HOCHOCH(C_6H_5)CH_2NHC(CH_3)_3$$
$$HOCH(CH{:}CH_2)CH_2NHC(CH_3)_3$$

The aminoalcohols may be prepared by a number of methods; numerous of them, such as 2-methyl-2-aminopropanol, are available commercially. Suitably unsaturated alcohols, such as 3,7-dimethyl-$\Delta^{6,7}$-octenol, may be reacted with hydrogen cyanide in the presence of sulfuric acid and the resultant formamide hydrolyzed to the requisite aminoalcohol. The reaction of formaldehyde and nitroalkanes, such as 2-nitrobutane and subsequent reduction gives aminoalcohols suitable for the operation of this invention.

The aminoalcohols (especially the N-substituted aminoalcohols needed for making the compounds of Formula II) may also be prepared by the reaction of an amine such as tertiary-alkyl substituted amine and an epoxide such as ethylene oxide or cyclohexylene oxide, or they may be obtained from a halohydrin like tetramethylene bromohydrin and the requisite amine, such as tertiary-alkyl substituted amine.

Another method of preparing the ethers of the invention that is particularly useful for preparing the compounds of Formula I wherein $R^2$ is other than hydrogen is to react an aminoalcohol with an aldehyde to produce a Schiff's base, to reduce the base and then to vinylate the reduction product with acetylene. Any of the aminoalcohols listed above which contain a primary amine group can be used as the starting material. The selection of aldehyde determines the specific $R^2$ group in the final compounds. Examples of compounds that are thus obtained are:

$$CH_2{:}CHOCH_2C(CH_3)_2NHCH_2(C_6H_5)$$

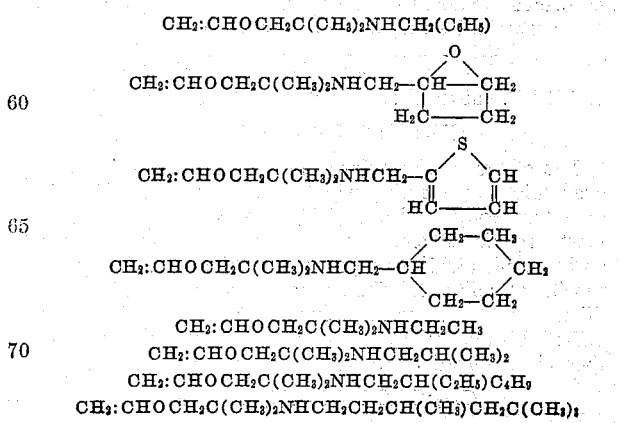

$$CH_2{:}CHOCH_2C(CH_3)_2NHCH_2CH_3$$
$$CH_2{:}CHOCH_2C(CH_3)_2NHCH(CH_3)_2$$
$$CH_2{:}CHOCH_2C(CH_3)_2NHCH_2CH(C_2H_5)C_4H_9$$
$$CH_2{:}CHOCH_2C(CH_3)_2NHCH_2CH_2CH(CH_3)CH_2C(CH_3)_3$$

CH₂:CHOCH₂C(CH₃)₂NHCH₂C₁₈H₃₇

CH₂:CHOCH₂—C(CH₃)(C₄H₉)NHCH₂(C₆H₅)

CH₂:CHO(CH₂)₂CH(CH₃)(CH₂)₃C(CH₃)₂NHCH₂CH(CH₃)₂

The aminoalkyl ethers of the invention are useful in a variety of ways. They are solvents and acid scavengers. They are insecticidal and fungitoxic agents. They are useful as additives and moderators for other animoplast resins. They are useful in the textile field as gas-fade inhibitors for cellulose acetate dyes. They are reactive intermediates that are adapted to react with numerous compounds to produce valuable derivatives having a wide variety of uses. Thus, they may be reacted with one or more moles of alkylene oxides, such as ethylene oxide or propylene oxide to produce surface active agents of essentially non-ionic character for use in the textile, paper and leather industries. The ethers or their alkylene oxide derivatives may be quaternized by such agents as benzyl chloride, dimethyl sulfate, and the like to produce compounds having fungicidal properties.

The ethers show selective reactivity. The amines will not readily react with ester groups or add to alpha-beta unsaturated esters. They will react with isocyanates, anhydrides, acid chlorides and similar agents that react readily with an active hydrogen.

The ethers can be reacted with a halocarbonate of the formula XCOOR° (X being chlorine or bromine and R° being an aliphatic hydrocarbon group) in the presence of an acceptor for the hydrogen halide that is split out, such as an alkali metal hydroxide or carbonate, a tertiary amine, such as pyridine or trimethylamine or even excess of the aminoalkyl ether, at a temperature of 0° to 100° C. in an inert organic solvent, such as benzene or toluene. Carbamates of the aminoalkyl vinyl ethers are formed in which the unsaturated vinyl group remains intact. For example, the reaction of CH₂:CHOCH₂C(CH₃)₂NH₂ with methyl chlorocarbonate produces a carbamate of the formula

CH₂:CHOCH₂C(CH₃)₂NHCOOCH₃

When this reaction is attempted to be carried out under these conditions with aminoethylvinyl ether or closely related ethers in which the nitrogen is not attached to a tertiary carbon atom and the oxygen and nitrogen atom are separated by a linkage containing only two or three carbon atoms, cyclization occurs with accompanying complete loss of vinyl unsaturation. Surprisingly, the carbamates of those ethers of the invention having only two or three carbon atoms separating the nitrogen and oxygen atoms of the ether are obtained without loss of the unsaturated vinyl groups by cyclization. The carbamates obtained polymerize by addition to produce valuable polymers useful as textile finishing agents, in coating compositions, and as adhesives.

The carbamates thus formed can be converted into isocyanates by heating them at a temperature of 170° to 300° C., in the presence of a fixed base, such as calcium oxide, potassium or sodium methoxide, potassium or sodium hydroxide or the like. As the isocyanate derivative is formed, it can be removed by simultaneous distillation. For example, heating the carbamate above (CH₂:CHOCH₂C(CH₃)₂NHCOOCH₃)

at 180° C. causes the production and distillation of

CH₂:CHOCH₂C(CH₃)₂NCO

The ethers of Formulas I and II can be converted to cyanamides by reacting with cyanogen chloride (CNCl) at a temperature of 0 to 75° C. in the presence of an inert organic solvent such as benzene or toluene and an inorganic alkaline reagent to combine with the hydrogen halide split out. The product may be purified by distillation under reduced pressure. For example, when CH₂:CHOCH₂C(CH₃)₂NH₂ is thus reacted with CNCl, there is obtained a cyanamide having the formula

CH₂:CHOCH₂C(CH₃)₂NHCN which is stable at ordinary room temperatures. This is remarkable in view of the fact that corresponding cyanamides from aminoethyl vinyl ether or aminopropylvinyl ether are unstable at room temperature and become resinous on standing apparently by some reaction other than mere vinyl polymerization.

The aminoalkyl vinyl ethers of the present invention can be polymerized by the use of azo catalysts. Surprisingly, the conversion to polymer is on the order of 90% or more, whereas other types of aminoalkyl vinyl ethers, in which the nitrogen atom is not attached to a tertiary carbon atom, undergo only a conversion of about 60% at the most with azo catalysts under corresponding conditions of polymerization.

The aminoalkyl vinyl ethers of the present invention are also copolymerizable. In this connection, they are far more versatile than aminoalkyl vinyl ethers, in which the nitrogen atom is not attached to a tertiary carbon atom in that a wider variety of comonomers can be successfully copolymerized with the new ethers with high yields or conversions; whereas aminoalkyl vinyl ethers in which the nitrogen atom is not attached to a tertiary carbon will add to the double bond of certain co-nonomers, namely, the esters or nitriles of α,β-unsaturated acids, at the amine group instead of copolymerizing by addition at the vinyl group. For example, at room temperature, aminoethyl vinyl ether adds to the double bond of methyl acrylate in such a way as to form the following compound:

CH₂:CHOC₂H₄NHCH₂CH₂COOCH₃

At higher temperatures, this reaction, as well as aminolysis, occurs to produce an amide. Aminolysis also occurs with any other esters as well, such as vinyl esters The compounds of Formulas I and II are thus unique in their ability to be copolymerized with acrylates, vinyl esters, acrylonitrile and many other vinyl monomers, especially esters to yield copolymers still retaining a primary or secondary reactive amine group. The reactivity of the compounds is such that the vinyl addition proceeds without interference by amine addition or reaction.

The prior art records the copolymerization of unsaturated tertiary amines with other vinyl monomers. Polymers and copolymers containing primary or secondary amine groups, however, have been prepared by the introduction of such groups into preformed polymers, such as by hydrolysis or reduction. Usually a primary or secondary amine cannot be copolymerized with acrylates, vinyl esters or acrylonitrile with retention of the active hydrogens because of the complications of addition of the amine groups to the alpha-beta unsaturation in the case of acrylates or acrylonitrile or of aminolysis in the case of acrylates or vinyl esters. Thus the following reactions are well known to occur:

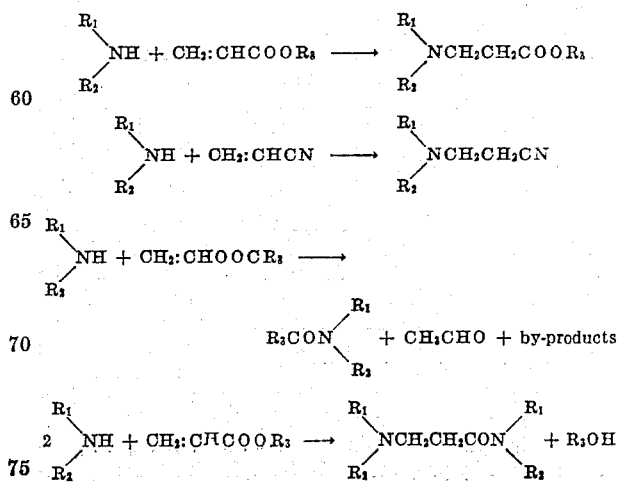

See for example Organic Reactions, volume V, p. 82 (Wiley, 1949).

Thus, the special utility of the compounds of this invention become apparent since these monomers do not add to the double bonds or react with the ester groups under conditions suitable for copolymerization. Thus a wide variety of binary, ternary, etc. copolymers and other resinous compositions may be easily and directly prepared containing primary and secondary amine groups capable of further reaction. These soluble copolymer compositions are useful as coatings, for making films and fibers, in textiles, as oil additives, corrosion inhibitors, and acid acceptors. They may be modified by reaction with monofunctional reactants such as anhydrides, oxides, isocyanates, acid chlorides, ketenes and the like and thus converted into a variety of soluble resins useful as textile agents, coatings, emulsifiers and impregnating compositions. In addition, they may be insolubilized by reaction with difunctional reagents such as diisocyanates, bischloroformates, bis-acid chlorides and the like to form insoluble coatings with excellent adhesion and chemical resistance or to form insoluble resins containing excess amine function useful as ion-exchange resins containing primary or secondary amine functionality.

As comonomers there may be used neutral or basic vinyl compounds such as the acrylic esters of simple alcohols such as methyl, ethyl, butyl, dodecyl, octadecyl, the methacrylate esters of such alcohols, vinyl esters such as vinyl acetate, propionate, butyrate, laurate, stearate, acrylonitrile, methacrylonitrile, hydrocarbons such as ethylene, styrene, vinyltoluene, N-vinyl compounds such as N-vinyl-N-methylacetamide, N-vinyl-pyrrolidone, N-vinyl carbazole, N-vinylsulfonamide, vinyl ethers such as butyl vinyl ether and other vinyl or vinylidene compounds.

The monomers of this invention may be further copolymerized with difunctional monomers such as diacrylates, divinylbenzene, divinyl ethers and the like to give insoluble products useful as ion-exchange resins. These resins are characterized by the presence of primary or secondary amine groups and in addition to functioning as anion-exchange resins, they are also able to remove from solutions many other types of compounds such as metals, aldehydes, epoxides, isocyanates, ketenes and the like.

The following examples are illustrative of the invention:

*Example I*

React 1800 g. of dry 2-amino-2-methylpropanol-1 with 44 g. of sodium metal and charge this mixture to a 3-liter, stirred autoclave swept with nitrogen, and seal the autoclave. Flush with nitrogen, then acetylene and bring the pressure to 50 p. s. i. gage with acetylene. The autoclave and contents are heated to 100° and the acetylene pressure increased to 500 p. s. i. g. slowly. The reaction required one hour and 16 minutes with a pressure range of 300 to 500 p. s. i. g. at 100° to 136° C. The crude product is flash-distilled and then redistilled to give 1760 g. of product, a yield of 84%; B. P. 70° C./120 mm. Hg, $N_D(20)$ 1.4293. The product was 96.7% pure by analysis for vinyl ether with hydroxylamine hydrochloride and corresponded to 2-aminoisobutyl vinyl ether of the formula $$CH_2\!:\!CHOCH_2C(CH_3)_2NH_2$$

The product is a water-white liquid with a mildly camphoraceous amine odor, soluble in water, methanol, and toluene.

The compound is useful as a fungicide. At 0.1% it gives 100% control of *Monolinia fructicola* and *Stemphylium sarcinaeforme*.

*Example II*

The general procedure of Example I was followed replacing the aminoalcohol entirely with 100 g. of

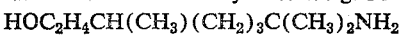

using 1.3 g. of sodium, heating to about 145° C. to produce an acetylene pressure of about 440 p. s. i. gage. The reaction took 70 minutes and 98.4 g. of

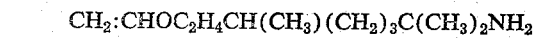

was obtained having a boiling point of 113° C. at 10 mm. Hg and $N_D(20)$ 1.4495. Its molar refractivity was calculated to be 62.21 and found to be 62.48.

The product is a colorless oil with a faint amine odor. It is an active fungicide and is particularly useful since it is relatively stable when applied as by spraying to plants. It is also a contact insecticide giving 50% to 100% control of red spider mites when applied at 1 part in 400 from an emulsion concentrate in a high-flash naphtha.

*Example III*

In a like manner the aminoalcohol, 2-amino-2-methylhexanol-1 (derived from the reduction of the product from formaldehyde and 2-nitropentane) was vinylated with acetylene to give a colorless oil that was purified by distillation at reduced pressure. Analysis for nitrogen and vinyl ether agreed substantially with the composition, $$CH_2\!:\!CHOCH_2C(CH_3)(C_4H_9)NH_2$$

This material is useful as a gas-fade inhibitor for cellulose acetate dyes. The compound is added at 5% by weight of acetate solids to the spinning dope and the fiber is dry spun in the usual manner. The resultant fibers when dyed resist more than 5 cycles in the gas-fade chamber.

*Example IV*

One mole of 2-isobutylamino-2-methylpropanol-1 (obtained by the catalytic hydrogenation of the viscous oil produced by the reaction of 2-amino-2-methylpropanol-1 and isobutyraldehyde) is vinylated by the procedure of Example I with acetylene in the presence of 10 mole percent of sodium at 450 pounds per square inch gage pressure and 130° C. A 70% yield is obtained of the vinyl ether.

$$CH_2\!:\!CHOCH_2C(CH_3)_2NHCH_2CH(CH_3)_2$$

The product is a colorless oil with only a faint amine odor. It is an effective gas-fade inhibitor when added to cellulose acetate dopes at 2% to 10% and processed into fibers and films.

In a similar manner the Schiff bases derived from 2-amino-2-methylpropanol-1 and formaldehyde, benzaldehyde, cyclohexylaldehyde, acetaldehyde, 2-ethylhexaldehyde, furfuraldehyde or thienylaldehyde and then reduced catalytically with hydrogen to give the corresponding N-substituted-2-amino-2-methylpropanol-1 are vinylated with acetylene as above and the corresponding vinyl ethers are produced having the formulas:

CH₂:CHOCH₂C(CH₃)₂NHCH₃

CH₂:CHOCH₂C(CH₃)₂NHCH₂(C₆H₅)

CH₂:CHOCH₂C(CH₃)₂NHCH₂CH₃

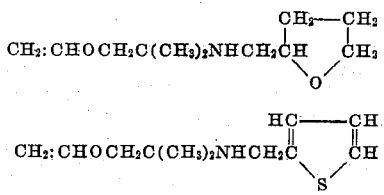

*Example V*

The product of vinylation obtained from 2-octadecylamino-2-methylpropanol-1 (made by hydrogenation of the Schiff's base of octadecylaldehyde and 2-amino-2-methylpropanol-1) is a viscous, light-yellow oil that is soluble in mineral oils and conforms to the structure, $$CH_2\!:\!CHOCH_2C(CH_3)_2NHCH_2C_{17}H_{35}$$

It is useful as a corrosion inhibitor and antioxidant for lubricating and cutting oils when added to such oils in amounts of 0.1 to 5%.

The product of vinylation similarly derived from 2-ethylhexaldehyde, and having the structure $$CH_2:CHOCH_2C(CH_3)_2NHCH_2CH(C_2H_5)CH_2CH_2CH_2CH_3$$

is obtained in good yield as a colorless, almost odorless oil readily soluble in organic solvents. It is an excellent fungicide controlling both *Stemphylium sarcinaeforme* and *Monolinia fructicola* at concentrations of 0.01% or less and showing good tenacity and stability on foliage. It is also useful in controlling fusarium wilt in infected tomatoes.

Example VI

A mixture of N-t-butylaminoethanol (113 g.) and 2.2 g. of sodium metal is charged to an autoclave and heated at 139–148° at an acetylene pressure of 450–500 p. s. i. g. for 2.5 hours. There is obtained 113 g. of product, a 92% yield, as a colorless oil, B. P. 76°/43 mm. Hg. $N_D(20)$ 1.4308.

The material is a fungicide giving control of both *Stemphylium sarcinaeforme* and *Monolinia fructicola*. A mixture of methyl acetate and the amine gives no amide after heating at 100° for several hours. A portion of the amine is treated carefully with an equivalent amount of ethyl isocyanate. The corresponding urea, $$CH_2:CHOCH_2CH_2N(C(CH_3)_3)CONHC_2H_5$$

is isolated as a white, crystalline solid in good yield.

Example VII

Reaction of a mixture of t-octylamine of the structure $$H_2NC(CH_3)_2CH_2C(CH_3)_3$$

and ethylene oxide gives N-t-octylaminoethanol as a colorless liquid in 90% yield, B. P. 80–84°/0.35–0.4 mm. A solution of 1.9 g. of sodium metal in 143 g. of N-t-octylaminoethanol was heated at 127–151° for 2 hours in the presence of acetylene at 350–425 p. s. i. gage. The resultant dark, viscous mixture was flash-distilled at reduced pressure and then redistilled to give 142 g. of product having the structure, B. P. 109° C./20 mm. Hg $N_D(20)$ 1.4478, a yield of 95%. The compound is useful as a contact insecticide giving $$CH_2:CHOC_2H_4NHC(CH_3)_2CH_2C(CH_3)_3$$

better than 50% kill of aphids and red spider mites when applied at 1 part in 400 from an emulsion concentrate. The product does not react with esters at 100° but does react with butyl isocyanate to give the urea.

Similarly the reaction product of cyclohexene oxide and t-butylamine, namely 2-t-butylaminocyclohexanol-1, may be vinylated to give the vinyl ether. The tertiary-alkyl substituted amine derived from a 24-carbon olefin and hydrogen cyanide may be reacted with ethylene oxide and the resulting aminoalcohol is converted to 2-N-t-tetracosylaminoethyl vinyl ether with acetylene.

Decamethylene bromohydrin is reacted with t-butylamine and the resultant aminoalcohol converted to N-t-butylaminodecyl vinyl ether with acetylene at 400 p. s. i. gage pressure in the presence of potassium metal at 120 to 150°.

Tertiary butylamine is reacted by heating with 1,2-epoxydodecane, 1,2-epoxyoctadecane, styrene oxide or 1,2-butadiene monoxide. The resulting N-t-butylaminoalcohols are converted to vinyl ethers by heating at 120 to 150° C. with acetylene at 200 to 500 p. s. i. gage pressure in the presence of 10 mole percent of sodium.

The following examples are illustrative of the polymers of the invention and their production:

Example VIII (a) A solution of 20 g. of 2-aminoisobutyl vinyl ether and 3 g. of dimethyl azoisobutyronitrile is heated in a nitrogen atmosphere at 75° C. for 16 hours. Residual monomer is removed by heating the mixture at 100° C. for 24 hours at 0.4 to 0.2 mm. Hg pressure to give 18 g. of viscous oil that almost becomes glassy at 25° C. The polyamine contained 10.5% nitrogen and had an ebulliometric molecular weight of 1500.

(b) The results of a number of polymerizations of the same monomer are tabulated below:

| Run | Percent Azo Catalyst | Solvent (percent by wt.) | °C. Temperature | Time (hrs.) | Percent Conversion |
|---|---|---|---|---|---|
| 1 | 5 | None | 75 | 16 | 72 |
| 2 | 10 | None | 75 | 63 | 96 |
| 3 | 5 | Benzene (50%) | 75 | 63 | 44 |
| 4 | 5 | Toluene (50%) | 75 | 63 | 42 |
| 5 | 5 | Water (50%) | 75 | 16 | 5 |

(c) The polymers prepared in parts (a) and (b) hereof are viscous oils to glasses varying in color from colorless to light amber and in molecular weight from 1000 to 1500. The polymers are soluble in water, methanol, i-propanol, dioxane, benzene, and toluene.

They have a $LD_{50}$ of 25 to 50 mg./kg. when administered intraperitoneally. They are effective gas-fade inhibitors for cellulose acetate fibers and films. When added to other spinning dopes such as solutions of polyacrylonitrile in dimethyl formamide in amounts of about 2 to 5% of the fiber-forming polymer, they impart to the resultant fibers or films increased dye-receptivity.

(d) A solution of 9 g. (.0782 mole) of the polymer of part (a) hereof in 500 ml. of benzene is stirred and there is slowly introduced 1.36 g. (.00782 mole) of 2,4-diisocyanatotoluene in 100 ml. of benzene. Precipitation begins after approximately ¾ of the diisocyanate is added. The precipitate is collected and dried to give 5.5 g. It contains 12.0% N. The hydroxyl number is 438 and the weak base capacity as an ion-exchange resin is 2.3 to 2.4 meq./g.

Example IX (a) By the procedure of Example VIII(a), 2-(N-2-ethylhexylamino)isobutyl vinyl ether is polymerized to give a viscous light-yellow polymer soluble in petroleum oils. The polymer is useful as a corrosion inhibitor and dispersant at 0.5 to 5% in lubricating oils.

(b) A mixture of 50 parts of 2(N-t-butylamino)ethyl vinyl ether and 8 parts of azoisobutyronitrile is heated at 65 to 70° for 36 hours to give a 50% yield of polymer. The polymer reacts readily with ethyl isocyanate to yield the corresponding poly(N-ethylurea) having the formula:

$$(-CH_2-CH-)_x$$
$$|$$
$$O-CH_2-CH_2-NCONHC_2H_5$$
$$|$$
$$C(CH_3)_3$$

Example X (a) A mixture of 80 g. (0.8 mole) of methyl methacrylate, 23 g. (0.2 mole) of 2-aminoisobutyl vinyl ether, 126 g. of β-ethoxyethyl acetate and 2.1 g. (2%) of azoisobutyronitrile is added slowly (over a two-hour period) to a 500 ml. flask maintained at 80° C. by means of an oil bath. Then an additional 0.2 g. of catalyst in 15 ml. of solvent is added. This addition is repeated an hour later. The final solution, to which the monomers had been charged at a concentration of 40%, has a Gardner-Holdt viscosity of K at 33.5% solids.

(b) Approximately 155 g. of the final solution containing 52 g. of polymer is treated with 2 liters of methanol, heated to reflux and then cooled to 25° C. The solution is decanted from the residual polymer and each fraction is dried and analyzed. The methanol-insoluble fraction contains 1.98% N, the soluble fraction 0.83% N. The theory for a 20 mole percent copolymer is 2.72%.

A solution of either fraction in β-ethoxyethyl acetate forms a gel upon treatment with p,p'-diisocyanatophenylmethane.

(c) A portion of the final polymer solution obtained in part (a) is coated onto metal and glass panels and baked at 125° C. for 30 minutes. The resultant coatings are hard, glossy, brittle and still soluble in organic solvents. Another portion of the polymer solution is mixed with 10% (on the weight of the polymer) of 1,8-paramenthane diisocyanate and again applied to metal and glass panels and baked at 125° C. for 30 minutes. The films thus obtained are equally hard and glossy but are insoluble in solvents.

(d) By the procedure of part (a) hereof, copolymers of the same vinyl ether were prepared with ethyl acrylate, acrylonitrile, vinyl acetate and mixtures of monomers such as butyl acrylate and ethyl methacrylate.

*Example XI*

A mixture of 10.4 g. of 2-aminoisobutyl vinyl ether, 2.0 g. of N,N-bis-vinyloxyethylurea and 1.0 g. of dimethyl azoisobutyrate is heated at 75° C. for 16 hours. The resultant friable gel is powdered, washed with water and dried to give 7.5 g. of a light-yellow solid containing 12.2% nitrogen.

The resin on evaluation as an ion-exchange resin is found to have a total capacity of 4.85 milliequivalents/gram.

In a similar fashion, 2-aminoisobutyl vinyl ether or any of the other compounds of this invention may be copolymerized with 0.5–20 mole percent of divinyl compounds such as methylene-bis-acrylamide, ethylene diacrylate, divinyl benzene, ethylene glycol-bis-vinyl ether, ethanedithiol-bis-vinyl ether and the like. The polymers may be formed in bulk, in suspension in aqueous systems to give beads or as suspensions in non-aqueous non-solvent systems to give particulate products.

The requisite N,N'-bis-vinoxyethylurea may be prepared by the fusion of 2 moles of 2-aminoethyl vinyl ether and one mole of urea at 120°–160° C. It is a white solid melting at 87°–88° C.

It is to be understood that changes and variations may be made without departing from the spirit and scope of the invention as defined by the appended claims.

We claim:
1. A composition comprising a vinyl ether selected from the group consisting of those of the Formulas I and II:

(I) $CH_2:CHOZC(R)(R')NHR^2$ (II) $CH_2:CHOANHC(R)(R')R^4$ in which Z is an alkylene group having 1 to 7 carbon atoms, R is an alkyl group having 1 to 4 carbon atoms, R' is an alkyl group having 1 to 4 carbon atoms, R² is selected from the group consisting of hydrogen, 2-tetrahydrofurfuryl-methyl, 2-thienyl, and hydrocarbon groups having 1 to 18 carbon atoms, A is a hydrocarbon group having 2 to 18 carbon atoms and having at least 2 carbon atoms between the ether oxygen and nitrogen, and R⁴ is an alkyl group having 1 to 21 carbon atoms.

2. A composition comprising a vinyl ether having the structure of the Formula I as defined in claim 1.

3. A composition comprising a vinyl ether having the structure of the Formula II as defined in claim 1.

4. A composition comprising a polymer of a vinyl ether selected from the group consisting of those of the Formulas I and II as defined in claim 1.

5. A composition comprising a polymer of a vinyl ether having the structure of Formula I as defined in claim 1.

6. A composition comprising a polymer of a vinyl ether having the structure of Formula II as defined in claim 1.

7. A composition comprising a copolymer of a vinyl ether selected from the group consisting of those of the Formulas I and II as defined in claim 1 with a monoethylenically unsaturated comonomer.

8. A composition comprising a copolymer of a vinyl ether selected from the group consisting of those of the Formulas I and II as defined in claim 1 with a polyethylenically unsaturated comonomer.

9. A composition comprising a copolymer of a vinyl ether selected from the group consisting of those of the Formulas I and II as defined in claim 1 and an ester of an acid of the group consisting of acrylic and methacrylic acid.

10. A composition comprising a compound of the formula $$CH_2:CHOCH_2C(CH_3)_2NH_2$$

11. A composition comprising a compound of the formula $$CH_2:CHOCH_2C(CH_3)(C_4H_9)NH_2$$

12. A composition comprising a compound of the formula $$CH_2:CHOCH_2C(CH_3)_2NHC(CH_3)_3$$

13. A composition comprising a compound of the formula $$CH_2:CHOCH_2C(CH_3)_2NHCH_2C_{17}H_{35}$$

14. A composition comprising a compound of the formula $$CH_2:CHOCH_2CH_2NHC(CH_3)_3$$

15. A composition comprising a copolymer of 2-aminoisobutyl vinyl ether and methyl methacrylate.

References Cited in the file of this patent
UNITED STATES PATENTS

| | | |
|---|---|---|
| 2,066,076 | Reppe et al. | Dec. 29, 1936 |
| 2,601,251 | Bruson | June 24, 1952 |
| 2,727,020 | Melamed et al. | Dec. 13, 1955 |